United States Patent
Wassmer et al.

(10) Patent No.: US 10,486,272 B2
(45) Date of Patent: Nov. 26, 2019

(54) TURBINE BLADE TIP RAIL FORMATION AND REPAIR USING LASER WELDING

(71) Applicant: GENERAL ELECTRIC COMPANY, Schenectady, NY (US)

(72) Inventors: Klaus-Dieter Hermann Maximilian Wassmer, Laufenburg (DE); Hans Bissig, Wohlen (CH); David Cafarelli, Zurich (CH); Norbert Lucke, Neuenhof (CH); Fabrizio Mangano, Dottikon (CH)

(73) Assignee: General Electric Company, Schenectady, NY (US)

( * ) Notice: Subject to any disclaimer, the term of this patent is extended or adjusted under 35 U.S.C. 154(b) by 114 days.

(21) Appl. No.: 15/913,185

(22) Filed: Mar. 6, 2018

(65) Prior Publication Data

US 2019/0275618 A1  Sep. 12, 2019

(51) Int. Cl.
*B23P 6/00* (2006.01)
*F01D 5/00* (2006.01)

(52) U.S. Cl.
CPC .............. *B23P 6/007* (2013.01); *F01D 5/005* (2013.01); *F05D 2230/234* (2013.01); *F05D 2230/40* (2013.01); *F05D 2230/80* (2013.01); *F05D 2230/90* (2013.01); *F05D 2240/307* (2013.01);
(Continued)

(58) Field of Classification Search
CPC .... B23P 6/007; F01D 5/005; F05D 2240/307; F05D 2300/175; F05D 2300/611; F05D 2230/40; F05D 2230/90; F05D 2230/234; F05D 2230/80
See application file for complete search history.

(56) References Cited

U.S. PATENT DOCUMENTS

| 5,900,170 A | 5/1999 | Marcin, Jr. et al. |
| 9,488,053 B2 | 11/2016 | Schmitt et al. |

(Continued)

FOREIGN PATENT DOCUMENTS

| EP | 0740976 A1 | 11/1966 |
| EP | 1674658 A1 | 6/2006 |
| EP | 2295189 A1 | 3/2011 |

(Continued)

OTHER PUBLICATIONS

European Search Report issued in connection with corresponding EP Application No. 19161139.1 , dated Jul. 12, 2019, 7 pages.

(Continued)

*Primary Examiner* — Moshe Wilensky
(74) *Attorney, Agent, or Firm* — Theodoros Stamatiadis; Hoffman Warnick LLC

(57) ABSTRACT

Methods of forming or repairing a tip rail of a turbine are disclosed. One method may include repairing the tip rail, or adding material to form the tip rail, by laser irradiating a wire material with a laser in an inert gas in a vicinity of a tip plate. The laser irradiating the wire material includes modulated pulsing the laser through: a warm up phase during which an on-power of the laser is increased over time to a maximum target on-power, a melt and bond phase during which the wire material is melted and during which the on-power is less than the maximum target on-power, and a stress releasing phase during which the on-power of the laser is less than the on-power during the melt and bond phase. Exterior surface coatings and/or TBC may be sprayed onto the tip rail to protect it.

18 Claims, 16 Drawing Sheets

(52) U.S. Cl.
CPC .. *F05D 2300/175* (2013.01); *F05D 2300/611* (2013.01)

(56) References Cited

U.S. PATENT DOCUMENTS

2007/0023403 A1    2/2007   Emiljanow
2011/0052386 A1    3/2011   Schoonover et al.

FOREIGN PATENT DOCUMENTS

EP    1743729 A2    1/2017
GB    2473111 A     3/2011
WO    2005007785 A2 1/2005

OTHER PUBLICATIONS

European Search Report issued in connection with corresponding EP Application No. 19161140.9 , dated Jul. 19, 2019, 6 pages.

TURBINE BLADE TIP RAIL FORMATION AND REPAIR USING LASER WELDING

CROSS-REFERENCE TO RELATED APPLICATIONS

This application is related to U.S. application Ser. No. 15/913,180, filed concurrently and currently pending, and hereby incorporated by reference in its entirety.

FIELD OF THE INVENTION

The subject matter disclosed herein relates to repair of turbine rotor blades, and more specifically, to formation or repair of a tip rail of a turbine rotor blade using laser welding.

BACKGROUND OF THE INVENTION

In a gas turbine engine, it is well known that air is pressurized in a compressor and used to combust a fuel in a combustor to generate a flow of hot combustion gases, whereupon such gases flow downstream through one or more turbines so that energy can be extracted therefrom. In accordance with such a turbine, generally, rows of circumferentially spaced turbine rotor blades extend radially outwardly from a supporting rotor disk. Each blade typically includes a dovetail that permits assembly and disassembly of the blade in a corresponding dovetail slot in the rotor disk, as well as an airfoil that extends radially outwardly from the dovetail.

The airfoil has a generally concave pressure side wall and generally convex suction side wall extending axially between corresponding leading and trailing edges and radially between a root and a tip. It will be understood that the blade tip is spaced closely to a radially outer turbine shroud for minimizing leakage therebetween of the combustion gases flowing downstream between the turbine rotor blades. Maximum efficiency of the engine is obtained by minimizing the tip clearance or gap such that leakage is prevented. However, this strategy is limited somewhat by the different thermal and mechanical expansion and contraction rates between the turbine rotor blades and the turbine shroud, and the motivation to avoid an undesirable scenario of having excessive tip rub against the shroud during operation.

It will be appreciated that conventional blade tips include several different geometries and configurations that are meant to prevent leakage and increase cooling effectiveness. One approach, referred to as a "squealer tip" arrangement, provides a radially extending tip rail that may rub against the tip shroud. The rail reduces leakage and therefore increases the efficiency of turbine engines. However, the tip rail of the squealer tip is subjected to a high heat load and is difficult to protect from wear—it is frequently one of the hottest regions in the blade. Accordingly, blade tip rails are subjected to hot gases and wear, which can cause high stresses and thus require periodic repair.

To protect turbine components, various exterior surface coatings are typically applied over the base materials thereof. Exterior surface coatings refer to coatings such as but not limited to anti-oxidation coatings like an overlay coating and/or a bond coating. A thermal barrier coating (TBC) may also be disposed over a bond coating. During surface life, cracks can form in the exterior surface coating(s) and can damage the exterior surface coating(s) and/or the base material of the turbine component. The exterior surface coating can also be oxidized and/or damaged due to wear. The damage may weaken the turbine component and/or alter the shape of the turbine component.

Repairing gas turbine components can be costly and time consuming. For example, many repairs require removal of at least some of the exterior surface coatings and large, time consuming material removal and replacement, e.g., using additively manufactured coupons. Where material is replaced, the process oftentimes requires exposure of the turbine component to welding and a high temperature heat treatment, each of which can damage the single crystal material of the component. The repair itself can also oxidize the exterior surface coatings and/or other parts of the turbine component that are not removed. This situation also impacts repair of a blade tip rail. Tip rail repair has the additional challenge that there may not be enough remaining tip rail thickness and adequate attachment points to create a long-lasting repair. No solution is currently available to adequately repair a turbine component or a blade tip rail thereof where the repair is made of suitable material, the process avoids a heat treatment at high temperature during the repair, and/or the repair can address the presence of an exterior surface coating on the component. Current processes also do not exist for manufacturing a blade tip rail without facing the above challenges.

BRIEF DESCRIPTION OF THE INVENTION

Various aspects of the disclosure include approaches for repairing or manufacturing a blade tip rail for a turbine rotor blade.

A first aspect includes a method for restoring a tip rail of a turbine rotor blade, the method including: repairing a damaged area in a tip rail of a turbine rotor blade by advancing a first wire material into the damaged area while first laser irradiating the first wire material with a laser in an inert gas in a vicinity of the damaged area, wherein the first laser irradiating the first wire material includes modulated pulsing the laser through: a first warm up phase during which an on-power of the laser is increased over time to a maximum target on-power for the first laser irradiating, a first melt and bond phase during which the wire material is melted and during which the on-power for the first laser irradiating is less than the maximum target on-power for the first laser irradiating, and a first stress releasing phase during which the on-power of the laser is less than the on-power during the melt and bond phase, wherein the first laser irradiated wire material forms a first weld material in the damaged area; first spraying a bond coating on at least an inner rail surface of the tip rail and the repaired damaged area; and second spraying a thermal barrier coating (TBC) coating on the bond coating.

A second aspect of the disclosure relates to a method for manufacturing a tip rail for a turbine rotor blade, the method including: providing the turbine rotor blade having a tip plate; forming at least a first portion of the tip rail by adding material to at least a portion of an area about the tip plate by laser irradiating a wire material with a laser in an inert gas in a vicinity of the at least a portion of the area about the tip plate, wherein the laser irradiating the wire material includes modulated pulsing the laser through: a first warm up phase during which an on-power of the laser is increased over time to a maximum target on-power for the first laser irradiating, a first melt and bond phase during which the wire material is melted and during which the on-power for the first laser irradiating is less than the maximum target on-power for the first laser irradiating, and a first stress releasing phase during which the on-power of the laser is less than the on-power during the melt and bond phase, wherein the irradiated wire material forms a first weld material forming the at least the first portion of the tip rail; first spraying a bond coating on at least an inner rail surface of the tip rail; and second spraying a thermal barrier coating (TBC) coating on the bond coating.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

Figure 1:
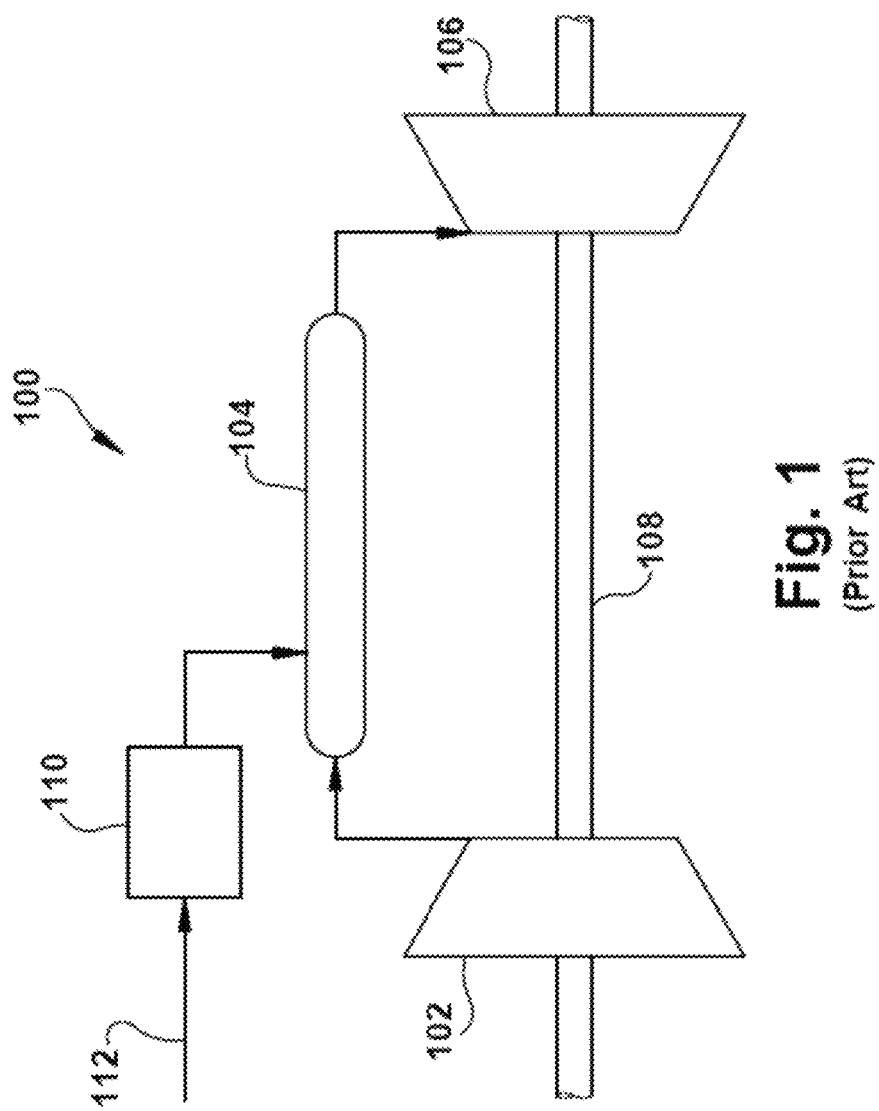
FIG. 1 is a schematic diagram of an embodiment of a turbomachine system according to the prior art.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a turbomachine system and relative to a turbine component. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a working fluid, such as combustion gases through the turbine engine or, for example, the flow of air through the combustor or coolant through or by one of the turbine's components. The term "downstream" corresponds to the direction of flow of the fluid, and the term "upstream" refers to the direction opposite to the flow. The terms "forward" and "aft," without any further specificity, refer to directions, with "forward" referring to an upstream portion of the part being referenced, i.e., closest to compressor, and "aft" referring to a downstream portion of the part being referenced, i.e., farthest from compressor. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure provide methods of forming or repairing a tip rail of a turbine. Methods may include repairing the tip rail, or adding material to form the tip rail, by laser irradiating a wire material with a laser in an inert gas in a vicinity of a tip plate. The laser irradiating the wire material includes modulated pulsing the laser through: a warm up phase during which an on-power of the laser is increased over time to a maximum target on-power, a melt and bond phase during which the wire material is melted and during which the on-power is less than the maximum target on-power, and a stress releasing phase during which the on-power of the laser is less than the on-power during the melt and bond phase. The laser irradiated wire material forms a weld material to repair or form at least a portion of the tip rail. The laser irradiating can have one pass or two passes, the latter with perhaps different weld materials or operational parameters. Exterior surface coatings may be sprayed onto the tip rail to protect it, and a thermal barrier coating (TBC) may be applied thereon. The methods allow for manufacture or restoration of tip rail such that it has superior properties compared to an original design. The tip rail may be made of a single crystal material such as a nickel superalloy. Further, the methods disclosed herein provide structural integrity and a long lifetime of the tip rail for either initial manufacture or tip rail restoration.

FIG. 1 is a schematic diagram of an embodiment of a turbomachine system, such as a gas turbine system 100. System 100 includes a compressor 102, a combustor 104, a turbine 106, a shaft 108 and a fuel nozzle 110. In an embodiment, system 100 may include a plurality of compressors 102, combustors 104, turbines 106, shafts 108 and fuel nozzles 110. Compressor 102 and turbine 106 are coupled by shaft 108. Shaft 108 may be a single shaft or a plurality of shaft segments coupled together to form shaft 108.

In one aspect, combustor 104 uses liquid and/or gas fuel, such as natural gas or a hydrogen rich synthetic gas, to run the engine. For example, fuel nozzles 110 are in fluid communication with an air supply and a fuel supply 112. Fuel nozzles 110 create an air-fuel mixture, and discharge the air-fuel mixture into combustor 104, thereby causing a combustion that creates a hot pressurized exhaust gas. Combustor 104 directs the hot pressurized gas through a transition piece into a turbine nozzle (or "stage one nozzle"), and other stages of buckets and nozzles causing turbine 106 rotation. The rotation of turbine 106 causes shaft 108 to rotate, thereby compressing the air as it flows into compressor 102. In an embodiment, hot gas path components, including, but not limited to, shrouds, diaphragms, nozzles, blades and transition pieces are located in turbine 106, where hot gas flow across the components causes creep, oxidation, wear and thermal fatigue of turbine parts. Controlling the temperature of the hot gas path components can reduce distress modes in the components. The efficiency of the gas turbine increases with an increase in firing temperature in turbine system 100. As the firing temperature increases, the hot gas path components need to be properly cooled to meet service life. Components with improved arrangements for cooling of regions proximate to the hot gas path and methods for making such components are discussed in detail herein. Although the following discussion primarily focuses on gas turbines, the concepts discussed are not limited to gas turbines.

Figure 2:
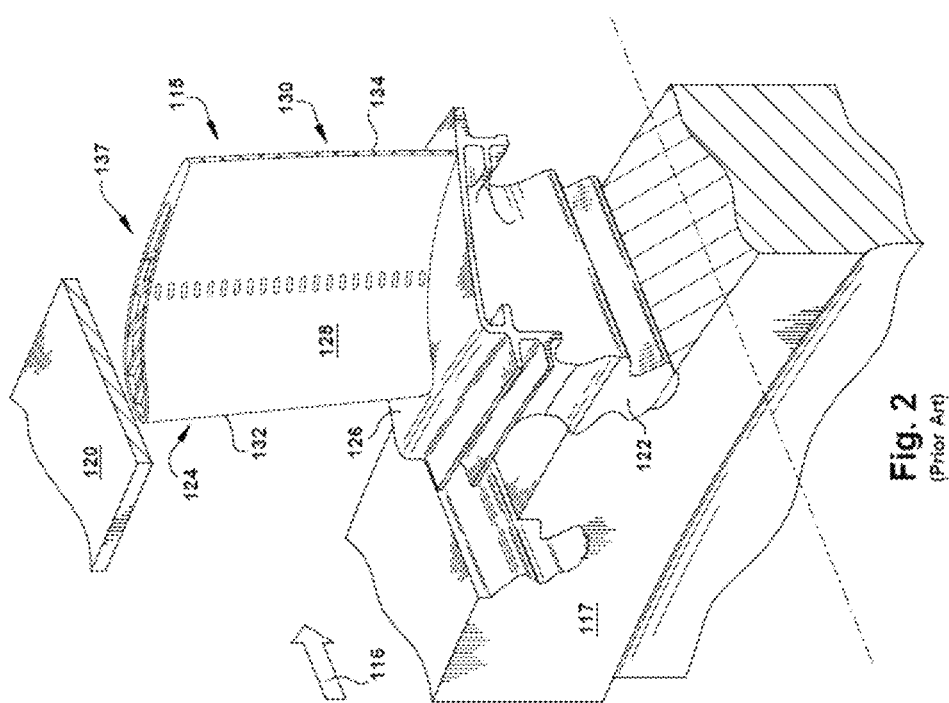
FIG. 2 is a perspective view of an illustrative turbine component in the form of a turbine rotor blade assembly including a rotor disk, a turbine rotor blade, and a stationary shroud, according to the prior art.

FIG. 2 is a perspective view of an illustrative conventional turbine component, a turbine rotor blade 115 which is positioned in a turbine of a gas turbine or combustion engine. It will be appreciated that the turbine is mounted downstream from a combustor for receiving hot combustion gases 116 therefrom. The turbine, which is axisymmetric about an axial centerline axis, includes a rotor disk 117 and a plurality of circumferentially spaced apart turbine rotor blades (only one of which is shown) extending radially outwardly from the rotor disk 117 along a radial axis. An annular, stationary turbine shroud 120 is suitably joined to a stationary stator casing (not shown) and surrounds turbine rotor blades 115 such that a relatively small clearance or gap remains therebetween that limits leakage of combustion gases during operation.

Each turbine rotor blade 115 generally includes a base 122 (also referred to as root or dovetail) which may have any conventional form, such as an axial dovetail configured for being mounted in a corresponding dovetail slot in the perimeter of the rotor disk 117. A hollow airfoil 124 is integrally joined to base 122 and extends radially or longitudinally outwardly therefrom. Turbine rotor blade 115 also includes an integral platform 126 disposed at the junction of airfoil 124 and base 122 for defining a portion of the radially inner flow path for combustion gases 116. It will be appreciated that turbine rotor blade 115 may be formed in any conventional manner, and is typically a one-piece casting, an additively manufactured part, or an additively manufacturing tip joined to a cast blade base section. It will be seen that airfoil 124 preferably includes a generally concave pressure side wall 128 and a circumferentially or laterally opposite, generally convex suction side wall 130 extending axially between opposite leading and trailing edges 132 and 134, respectively. Side walls 128 and 130 also extend in the radial direction from platform 126 to a radially outer blade tip or, simply, tip 137.

Figure 3:
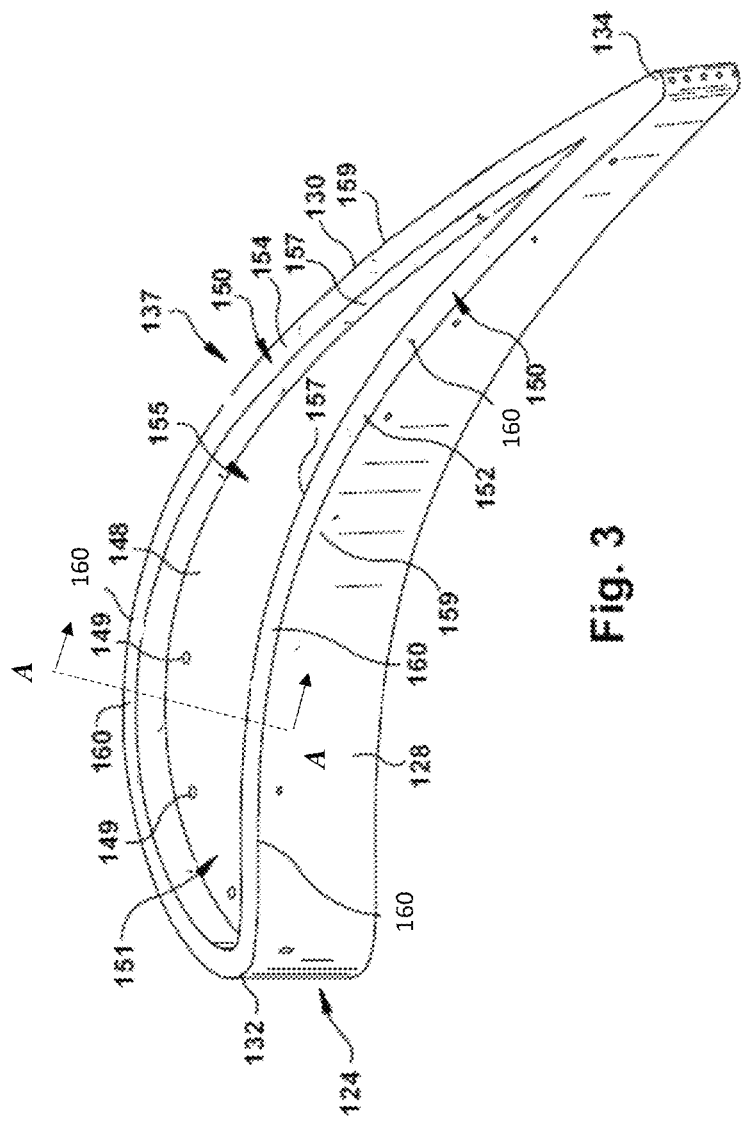
FIG. 3 is a close-up, perspective view of a tip of a turbine component in the form of a turbine rotor blade for which embodiments of the disclosure may be used.

FIG. 3 provides a close-up, perspective view of an illustrative turbine rotor blade tip 137 for which embodiments of the present disclosure may be employed. In general, blade tip 137 is disposed opposite base 122 (FIG. 2) and includes a tip plate 148 defining an outwardly facing tip end 151 between pressure side wall 128 and suction side wall 130. Tip plate 148 typically bounds internal cooling passages disposed within airfoil 124, and are defined between pressure side wall 128 and suction side wall 130 of airfoil 124. The airfoil chamber is configured to supply a coolant through airfoil 124, e.g., in a radial direction. That is, coolant, such as compressed air bled from the compressor, may be circulated through the airfoil chamber during operation. The airfoil chamber may include any now known or later developed coolant carrying passages or circuits including but not limited to: cooling passages, impingement sleeves or elements, connecting passages, cavities, pedestals, etc. Tip plate 148 may be integral to turbine rotor blade 115, or it may be welded/brazed into place after the blade is cast. Cooling passages 149 may extend through tip plate 148.

Due to certain performance advantages, such as reduced leakage flow, blade tips 137 frequently include a tip rail, or simply, rail 150. Coinciding with pressure side wall 128 and suction side wall 130, rail 150 may be described as including a pressure side wall rail 152 and a suction side wall rail 154, respectively. Generally, pressure side wall rail 152 extends radially outwardly from tip plate 148 and extends from leading edge 132 to trailing edge 134 of airfoil 124. As illustrated in FIG. 3, the path of pressure side wall rail 152 is adjacent to or near the outer radial edge of pressure side wall 128 (i.e., at or near the periphery of tip plate 148 such that it aligns with the outer radial edge of the pressure side wall 128). Similarly, as illustrated in FIG. 3, suction side wall rail 154 extends radially outwardly from tip plate 148 and extends from leading edge 132 to trailing edge 134 of airfoil 124. The path of suction side wall rail 154 is adjacent to or near the outer radial edge of suction side wall 130 (i.e., at or near the periphery of the tip plate 148 such that it aligns with the outer radial edge of the suction side wall 130). Both pressure side wall rail 152 and suction side wall rail 154 may be described as having an inner rail surface 157, an outer rail surface 159 and a radially outward facing rail surface 160 between inner rail surface 157 and outer rail surface 159. It should be understood though that rail(s) may not necessarily follow the pressure or suction side wall rails. That is, in alternative types of tips in which the present disclosure may be used, tip rails 150 may be moved away from the edges of tip plate 148 and may not extend to trailing edge 134.

It will be appreciated that tip rail 150 defines a tip pocket 155 at tip 137 of turbine rotor blade 115. As one of ordinary skill in the art will appreciate, a tip 137 configured in this manner, i.e., one having this type of tip pocket 155, is often referred to as a "squealer tip" or a tip having a "squealer pocket or cavity." The height and width of pressure side wall rail 152 and/or suction side wall rail 154 (and thus the depth of tip pocket 155) may be varied depending on best performance and the size of the overall turbine assembly. It will be appreciated that tip plate 148 forms the floor of tip pocket 155 (i.e., the inner radial boundary of the cavity), tip rail 150 forms the side walls of tip pocket 155, and tip pocket 155 remains open through an outer radial face, which, once installed within a turbine engine, is bordered closely by annular, stationary turbine shroud 120 (see FIG. 2) that is slightly radially offset therefrom. Radially outward facing rail surface 160 of rail 150 may rub against annular, stationary turbine shroud 120.

Turbine rotor blade 115 may be made by, for example, a casting or additive manufacture technique. Turbine rotor blade 115, pressure and suction side walls 128, 130, a tip plate 148, and a tip rail 150 may be integrally cast or additively manufactured as a one-piece body. However, in other situations, turbine rotor blade 115 is manufactured without tip rail 150, and it is added per methods described herein.

Figure 4:
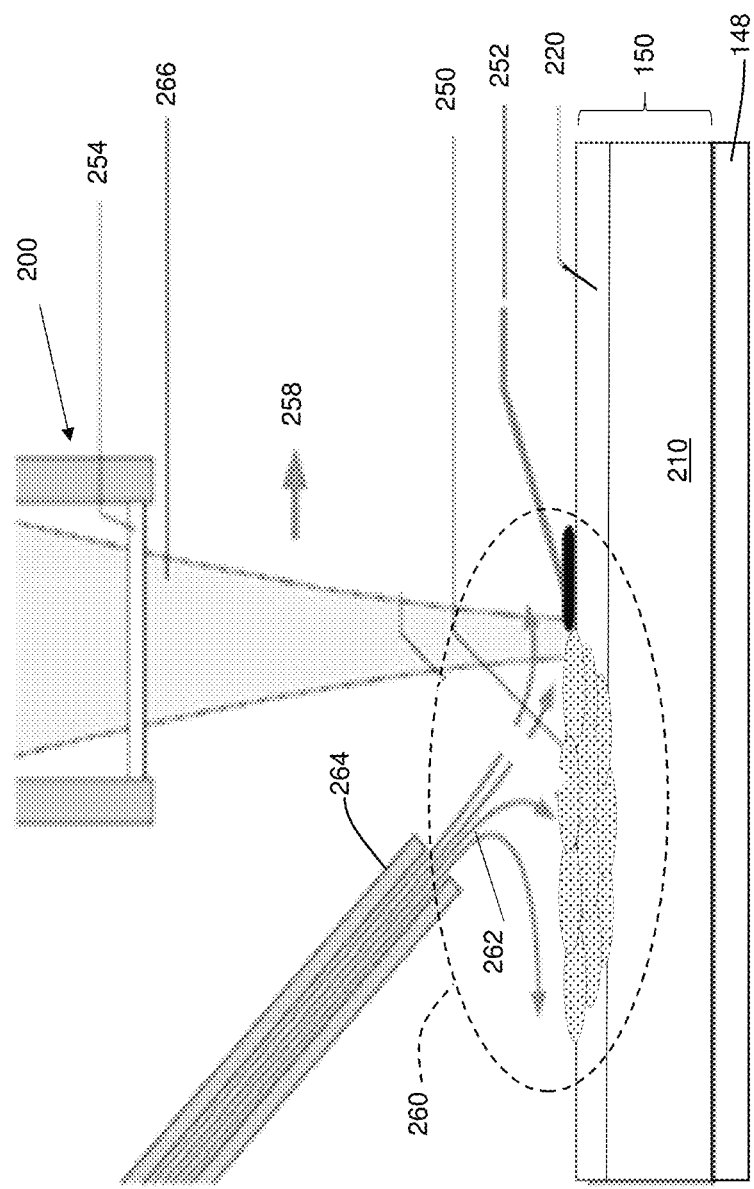
FIG. 4 shows a schematic diagram of modulated pulsed laser repair apparatus for carrying out methods according to various embodiments of the disclosure.

FIG. 4 is a schematic depiction showing a laser system 200 used to repair tip rail 150 or form tip rail 150, using a modulated pulsed laser. As used herein, "modulated pulse" indicates the amplitude, frequency, phase and/or intensity of the laser can be varied in accordance with another signal. FIG. 4 shows a repair embodiment for purposes of description. In this embodiment, tip rail 150 is already formed and is in the process of being repaired; however, laser system 200 may also be used to form or replace tip rail 150 as described herein. Tip rail 150 may have a base material 210 and a protective exterior surface coating(s) 220 on some portions thereof. As will be described in certain embodiments, at least exterior surface coating(s) 220 has been damaged. The damaged area may be caused by the loss, oxidation, wear, cracking or spalling of exterior surface coating(s) 220. The damaged area can extend into base material 210.

Base material 210 can include an alloy, such as a high-gamma prime superalloy. Examples include gamma prime (γ') precipitation-strengthened nickel-based superalloys or cobalt-based superalloys. "Gamma prime" (γ') is the primary strengthening phase in nickel-based alloys. Each of these alloys has a relatively high gamma prime (principally $Ni_3$(Al,Ti)) content as a result of containing significant amounts of aluminum and/or titanium. Nickel-based superalloys may include but are not limited to: Inconel 738; Inconel 625; IN739, CM-247-LC, Haynes 282®; Haynes 230; GTD 111, GTD 222, GTD 444, Rene N5, Rene N4, Rene 80, Rene 125, René 108; MAR-M-247; CMSX-4; and MD2 alloy. Cobalt-base superalloys may include but are not limited to: FSX-414 and X45. In embodiments, base material 210 may be formed from advanced superalloys of the single crystal type. Single crystal is characterized by being at least about 80 percent by volume, and more preferably at least about 95 percent by volume, a single grain with a single crystallographic orientation. There may be minor volume fractions of other crystallographic orientations and also regions separated by low-angle boundaries. The single crystal structure is prepared by the directional solidification of an alloy composition, usually from a seed or other structure that induces the growth of the single crystal and single grain orientation. Nickel-base superalloys used to form single crystal structures may rely on the presence of aluminum to form $Ni_3Al$ (gamma prime) as the primary strengthening phase for alloys used to form articles subjected to high stresses in high temperature environments. For example, Rene N5 contains about 5 to about 7 weight percent aluminum, and CMSX-10 has a nominal aluminum content of about 5.7 weight percent. In other embodiments, the base material 210 can be polycrystalline or directionally solidified material.

Exterior surface coating(s) 220 may include an overlay coating and/or a bond coating. The overlay coating or bond coating may include any now known or later developed overlay of bond coating material such as but not limited to: MCrAlY, where M may be nickel (Ni) or cobalt (Co) or a combination thereof, cobalt nickel (CoNi) or nickel cobalt (NiCo). As will be explained, exterior surface coating(s) 220 can also be removed, along with any thermal barrier coating (not shown in FIG. 4), prior to a repair being conducted as shown in FIG. 4.

As shown in FIG. 4, modulated pulsed laser welding according to embodiments of the disclosure includes creating a weld material 250 from a wire material 252. As noted, FIG. 4 shows a repair embodiment for purposes of description of laser system 200. In this embodiment, tip rail 150 is already formed and includes exterior surface coating(s) 220 and is in the process of being repaired; however, laser system 200 may also be used to form tip rail 150 as described herein. Wire material 252 is in contact with a repair zone or an area to have material added, and is melted by exposure to laser radiation. An operator can manually feed wire material 252 (FIG. 4) under laser radiation, or the wire material can be fed in any now known or later developed automated process. Laser 254 emits laser radiation 266 in a specified modulated pulse onto wire material 252. Modulated pulsed laser radiation 266 generates heat at wire material 252 which melts wire material 252 and provides weld material 250 (into the repair zone or area to have material added) for bonding the weld material. As will be described in greater detail herein, where a repair is being made (shown in FIG. 4), weld material 250 may fill a repair zone, attaching to base material 210 and/or exterior surface coating(s) 220 (shown, but could be removed) of tip rail 150. Where material is being added to tip rail 150, weld material 250 bonds to base material 210 of tip rail 150. In embodiments, base material 210 may be partially melted during the laser irradiation. Because of the modulated pulsed nature of the laser irradiation described below, wire material 252 and a limited region of base material 210 melts with a limited heat input into tip rail 150. Laser 254 is moved in the direction indicated by arrow 258. Wire material 252 is advanced in the same direction 258 as laser 254.

During the welding process, welded area 260 is shielded with an inert gas 262 through nozzle 264, i.e., in the vicinity of plate 148. Nozzle 264 directs inert gas 262, shown as arrows, over welding area 260 to prevent oxidation. The inert gas may be argon, argon-hydrogen or nitrogen. Because inert gas 262 is provided over welding area 260, tip rail 150 does not need to be in an enclosure filled with inert gas.

Figure 5:
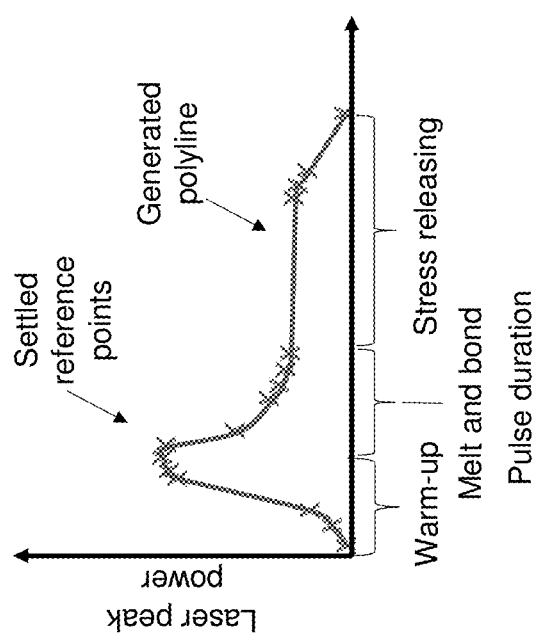
FIG. 5 shows a graphical representation of power versus time for a modulated pulsed laser according to various embodiments of the disclosure.

The modulated pulse laser radiation according to embodiments of the disclosure eliminates the need of pre-heat and post-heat treatment of tip rail 150 as well as heating tip rail 150 during the welding process. Laser 254 may be a solid-state laser. A solid state laser uses a gain medium that is a solid. State of the art pulse shapes have a rectangular pulse profile with an abrupt increase and decrease of the laser peak power. Initial abrupt peak power can lead to stress and weld defects. The power characteristics of the laser irradiation used in embodiments of the disclosure is shown in FIG. 5. The power is adapted to the wire material weldability and extent of a damaged area to be repaired or an amount of material to be added.

In accordance with embodiments of the disclosure, a laser irradiation of wire material 252 includes pulsing the laser through a number of different phases. Each of the phases of the pulse in FIG. 5 can be extended or reduced in duration. In accordance with embodiments of the disclosure, an initial phase includes a warm up phase during which an on-power of laser 254 is increased over time to a maximum target on-power for the first laser irradiating, i.e., a maximum power desired for the welding (not necessarily the maximum power of the laser). This phase avoids immediate peak power which can lead to stress welding defects. A second phase includes a melt and bond phase during the wire material is melted and during which the on-power for the laser irradiating is less than the maximum target on-power. During this phase, the weld material is bonded to tip plate 148 and/or tip rail 150, i.e., to exterior surface coating(s) 220 and/or base material 210. The melt and bond phase uses approximately 50% to 90% of the maximum target on-power of the first laser irradiating. During the melt and bond phase, the on-power may be slowly reduced as wire material 252 melts. The final phase includes a stress releasing phase during which the on-power of the laser is less than the on-power during the melt and bond phase. In one example, so long as the on-power is less than the melt and bond phase level, the stress releasing phase may use up to 80% of the laser on-power. In another example, so long as the on-power is less than the melt and bond phase level, the stress releasing phase may less than 50% of the laser on-power. During this latter phase, heat is dispersed throughout tip rail 150 and stress relaxation in the component occurs. As a result, and as will be described in greater detail herein, laser irradiated wire material 252 forms weld material 250 in a damaged area of tip rail 150, or is added to an area of about tip plate 148 to form tip rail 150. The laser irradiation process can be repeated for each of exterior surface coating (s) 220 and base material 210. That is, laser irradiation can be carried out using a first wire material 252 configured to create base material 210, and a second laser irradiation (i.e., step with different wire and/or laser parameters) can be carried out using a second wire material 252 configured to create exterior surface coating(s) 220. The first and second wire material can be different. Each irradiation can follow the afore-described process customized for the particular materials, extent of damaged area, etc.

In terms of duration, the warm-up phase expends from approximately 0.1 to 5 percent of the laser irradiating total duration, i.e., the total time the laser is heating wire material 252. The melt and bond phase expends from approximately 4.9 percent to approximately 30 percent of the laser irradiating total duration. The stress releasing phase expends from approximately 65 percent to approximately 95 percent of the laser irradiating total duration. Each phase of the pulse in FIG. 5 may be extended or reduced in duration, e.g., depending on wire material 252, tip rail geometry, etc. The pulse shown in FIG. 5 is a fitted polyline using settled reference points in terms of peak power/pulse time. In this way, the pulse profile has a continuous and smooth evolution.

The process disclosed herein avoids pre-welding heat treatment and post-welding heat treatment. The duration of the pulse is from between approximately 10 milliseconds (ms) to approximately 100 ms, or in some embodiments, from approximately 45 ms up to approximately 85 ms. By modulating the signal to create the pulse of the laser irradiation, every single pulse can be adjusted. The shape of each pulse can be controlled. The pulse curve may be adapted to the wire material weldability and the maximum heat input provided to tip rail 150.

In embodiments, laser irradiation 266 (FIG. 4) may have circular spot size on the wire material, during the welding process, and may be from approximately 100% of wire material 252 diameter to about 130% of the wire material diameter. This arrangement provides a smooth distribution of the energy over the entire wire and avoids damage from hot spots.

The main process parameters of modulated pulsed laser wire welding and their correlation with welding quality are as follows. The laser peak power is dependent on wire material 252 and diameter. Wire material 252 diameter is between approximately 0.1 and approximately 1.0 mm. The diameter of wire material may range from 0.1 to 1.0 mm with a tolerance of ±0.05 mm. The roundness of wire material may be at least 0.8 where ideal roundness is indicated by 1.0. Roundness is based on the ratio between the inscribed and the circumscribed circles, i.e., the maximum and minimum sizes for circles that are just sufficient to fit inside and to enclose the shape. Straightness of wire material provides for a maximum deviation along wire axis of ±1 mm. The wire material may have a surface roughness of no more than 25 microns. As will be described, different type of wire materials 252 can be used for the wire. The peak power value is normally between approximately 0.5 kilowatts (kW) to approximately 3 kW. The modulated pulse shape may be defined according to the base material sensitivity to cracks.

The translation speed of the laser during the welding is chosen in combination with the laser frequency in order to achieve the target spot to spot overlap. The laser frequency is defined according to the translation speed in order to achieve the required spot to spot overlap between 2 consecutive laser shots for a reliable and uniform welding bonding. The laser frequency may be, for example, from approximately 2 hertz (Hz) up to approximately 20 Hz. Some advantages of this technique are the high position accuracy and the process flexibility due to controlled operation of wire material 252 and laser 254.

FIG. 6-15 show sectional views of tip 137 along line A-A of FIG. 3. FIGS. 6-15 show various embodiments of a methods of repairing and/or manufacturing tip rail 150. Embodiments of the disclosure can provide turbine rotor blade 115 with a damaged tip rail 150, or with no tip rail 150.

Where a damaged tip rail 150 is present, tip rail 150 can be removed and a new one manufactured in its place, or a damaged area can be filled with new material. Alternatively, where no tip rail 150 is provided, e.g., turbine rotor blade 115, is manufactured without one or has had it removed previously, a tip rail 150 can be manufactured on tip plate 148 thereof.

Figure 6:
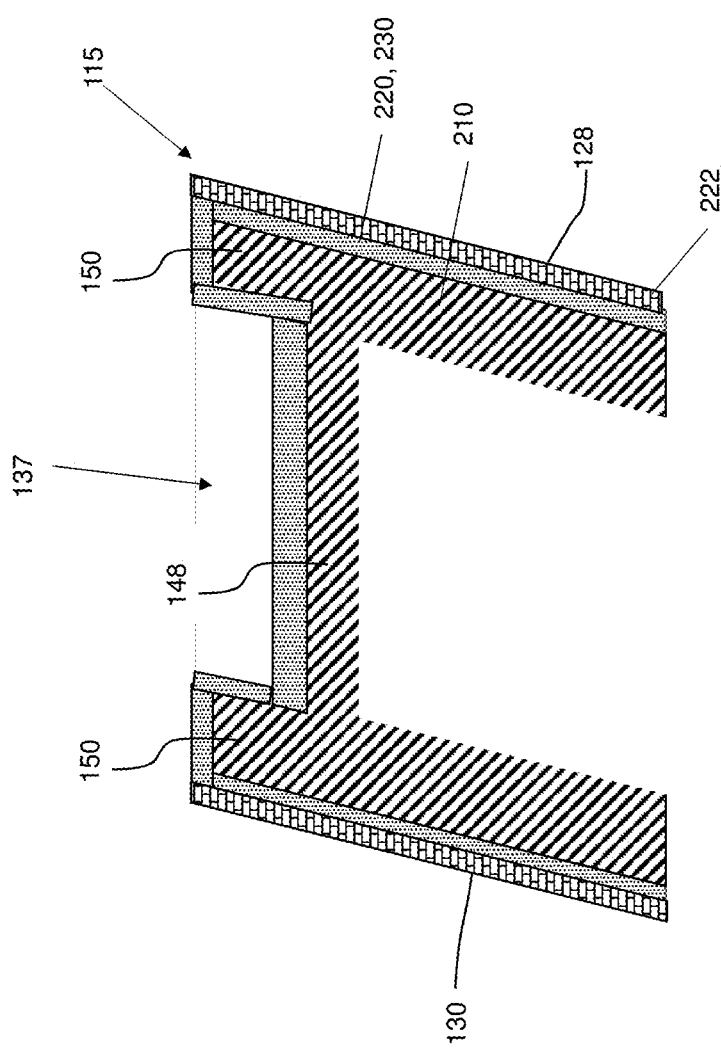
FIG. 6 shows a sectional view of a portion of turbine rotor blade of FIG. 3 along line A-A.
Figure 7:
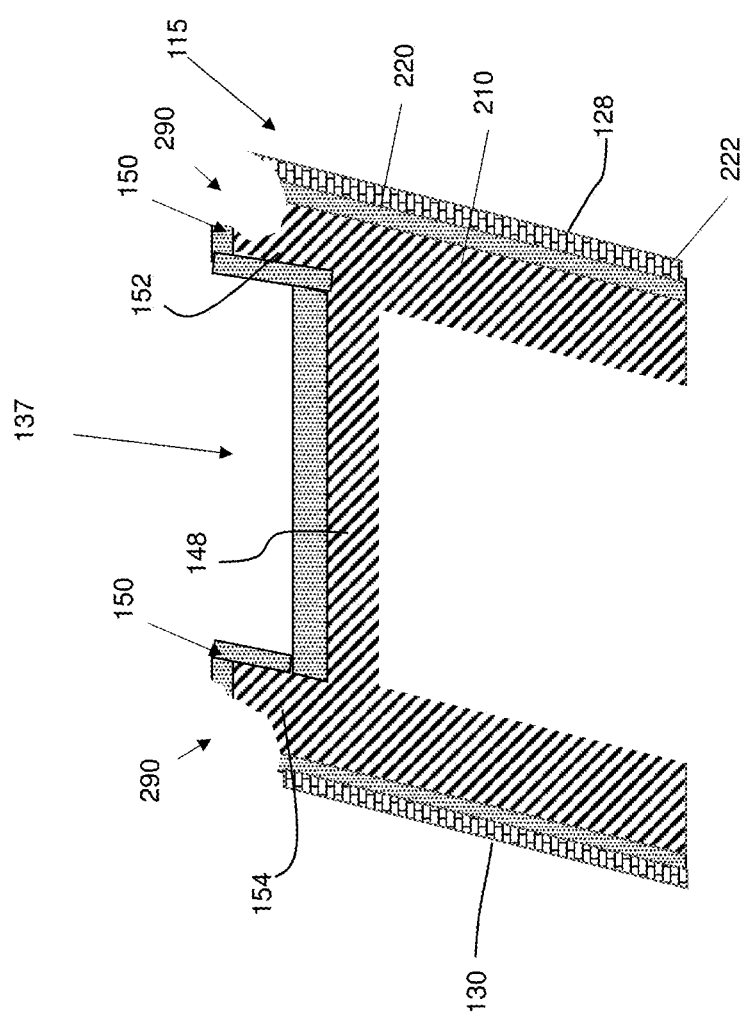
FIG. 7 shows a sectional view of a tip of a turbine rotor blade having a damaged tip rail.

FIGS. 6-11 shows embodiments of repair of a damaged tip rail. As an introduction, FIG. 6 shows a tip rail 150 and tip plate 148, each made of base material 210, prior to damage. In this example, exterior surface coating 220 includes a bond coating 230 disposed between TBC 222 and base material 210. When tip rail 150 is damaged, it is necessary to repair tip rail 150. FIG. 7 shows a sectional view of turbine rotor blade 115 provided having damage at tip rail 150, indicated as damaged area 290. Tip rail 150 has been damaged by, for example, the loss, cracking or spalling. While damaged area 290 has been shown on both pressure side wall rail 152 and a suction side wall rail 154, it is understood that it can occur at any location or locations of tip wall rails 152, 154. Further, while damaged area 290 is extending into base material 210, it may only be in external surface coating(s) 220. The various process steps for repairing tip rail 150 are shown in FIGS. 8-11.

Figure 8:
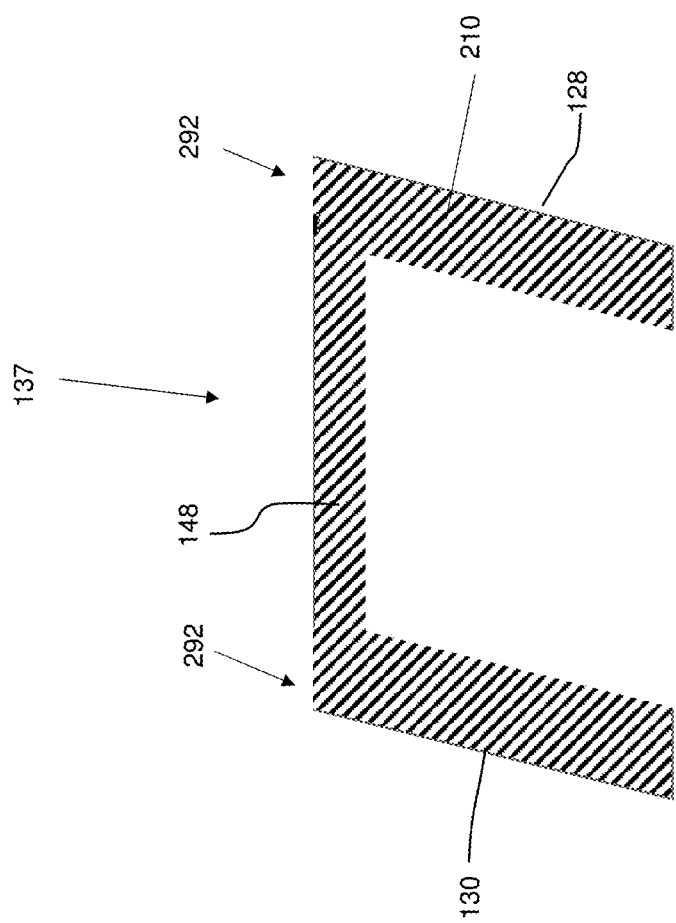
FIG. 8 shows a sectional view of a tip of a turbine rotor blade subjected to a machining operation according to various embodiments of the disclosure.

FIG. 8 shows one embodiment in which damaged area 290 in FIG. 7 is removed by machining manually, with a computer numerical controller (CNC) machine and/or any other computer controlled machining process. In embodiments, the machining can remove damaged area 290 all the way to tip plate 148 creating repair zone 292 having smooth surfaces. Here, exterior surface coating(s) 220 and TBC 222 may also be removed. Where the machining includes grinding, it may be performed with carbide tools, for example. As is understood in the art, the heat input caused by the machining may be controlled to limit heat input into turbine rotor blade 115. In FIG. 8, substantially all of tip rail(s) 150 (FIG. 7) with damaged area 290 (FIG. 7) is removed leaving the fully exposed tip plate 148.

Figure 9:
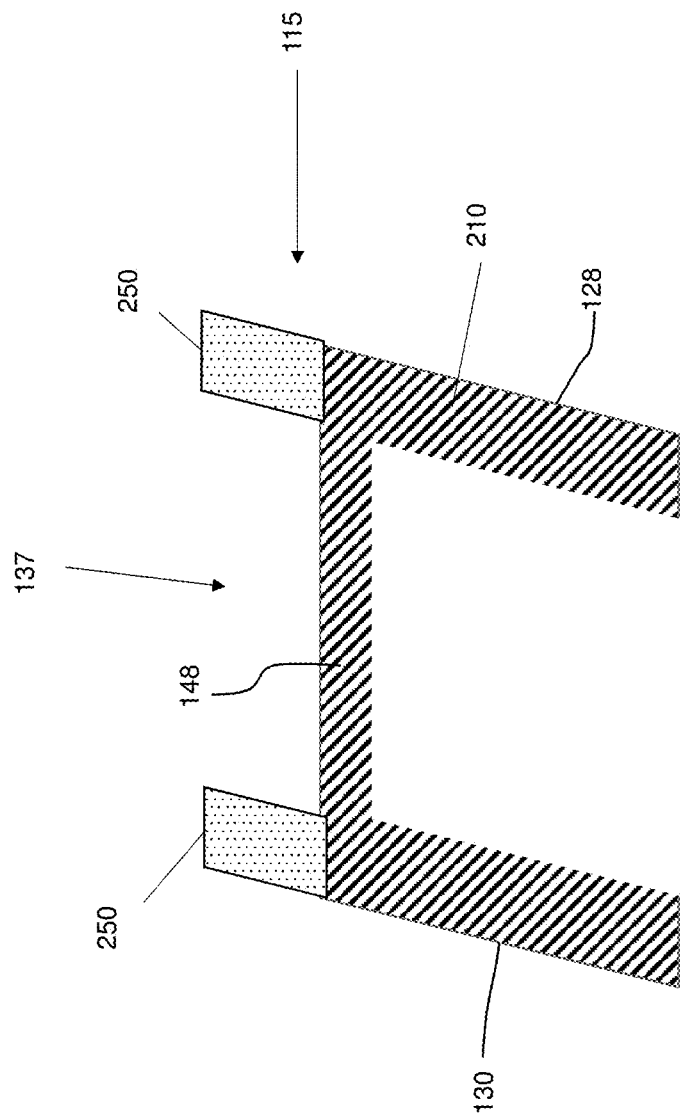
FIG. 9 shows a sectional view of a tip of a turbine rotor blade subjected to a welding process according to various embodiments of the disclosure.

FIG. 9 shows repair of damaged area 290 (FIG. 8) by advancing wire material 252 (FIG. 4) into damaged area 290 (FIG. 7), now repair zone 292 (FIG. 8), while laser irradiating wire material 252 (FIG. 4) with laser 254 (FIG. 4), i.e., beam of laser irradiation 266, in inert gas 262 (FIG. 4) in a vicinity of damaged area 290, i.e., repair zone 292. The laser irradiation follows the phases as described previously herein. One or more layers may be applied in repair zone 292 (FIG. 8). Welded material 250 repairs, i.e., by re-forming, at least a portion of tip rail 150 along at least a portion of tip plate 148. One or more layers of weld material 250 may be applied until the shape of tip rail prior to any damaged is restored, which may occur after subsequently applied machining. The layers can be performed with one weld wire material or with a combination of two different wire material compositions.

Figure 10:
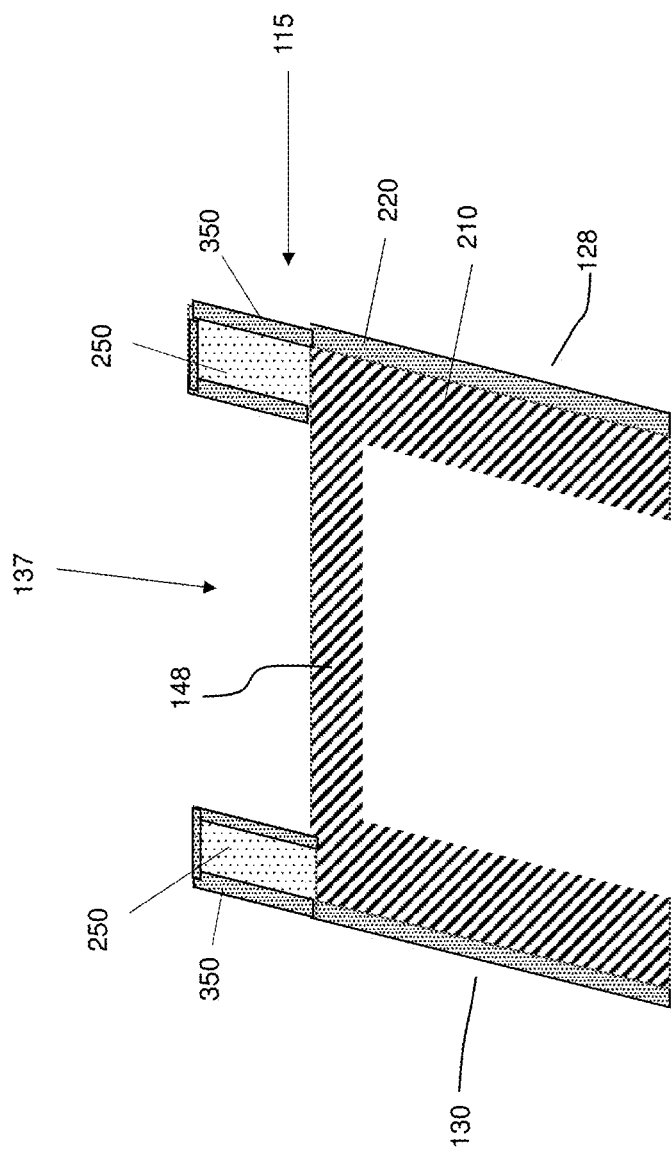
FIG. 10 shows a sectional view of a tip of a turbine rotor blade subjected to a welding process according to various embodiments of the disclosure.

In embodiments, the composition of weld material 250 in FIG. 9 to repair tip rail 150 may be any of the aforedescribed materials for base material 210, e.g., nickel based superalloy. In the embodiment shown in FIG. 10, a first laser irradiating step provides first weld material 250, for example, Haynes 282® to create base material 210 to build up tip rail 150 followed by providing a second laser irradiating step to provide second weld material 350 of exterior surface coating(s) 220 (FIG. 6) (e.g., a more oxidation resistance material such as MCrAlY, described previously) on first weld material 250. Such oxidation resistance weld material 350 can improve the oxidation resistance of tip rail 150. In FIG. 10, second weld material 350 is shown as a bond coating having a material (i.e., shading) that matches that of external surface coating(s) 220. It is understood that second weld material 350 need to be the same as external surface coating(s) 220.

Figure 11:
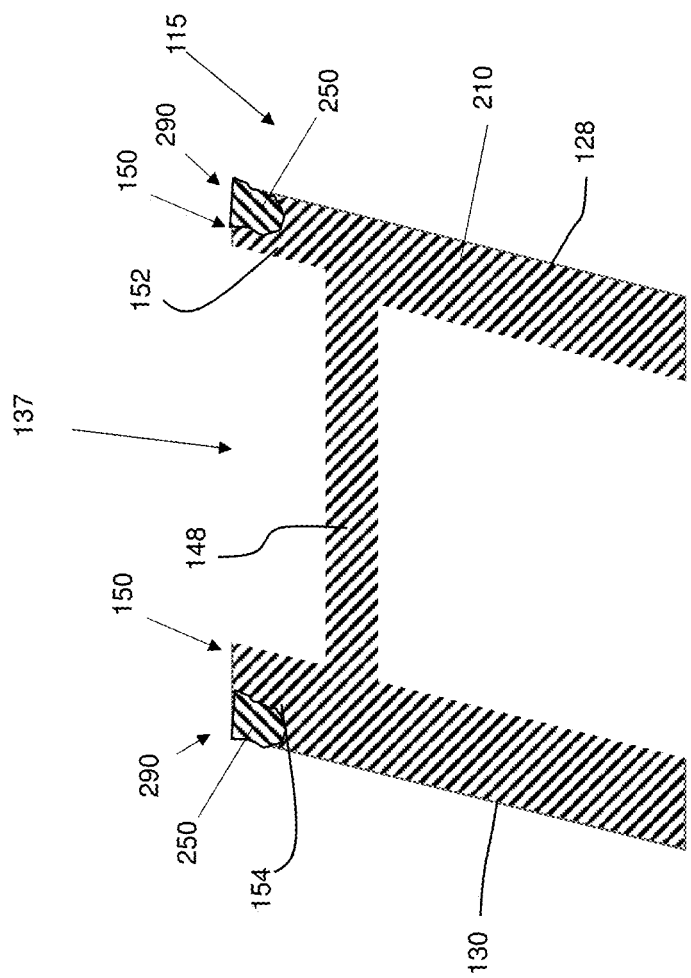
FIG. 11 shows a sectional view of a tip of a turbine rotor blade subjected to a welding process according to various alternative embodiments of the disclosure.

FIG. 11 shows repair of damaged area 290 (FIG. 7) without removal of the rest of tip rail 150, e.g., by advancing wire material 252 (FIG. 4) into damaged area 290 while laser irradiating wire material 252 with laser 254, i.e., beam of laser irradiation 266, in inert gas 262 (FIG. 4) in a vicinity of damaged area 290. Here, exterior surface coating(s) 220 and TBC 222 may also be removed. The laser irradiation follows the phases as described previously herein. One or more layers may be applied in damaged area 290 (FIG. 7). Welded material 250 repairs, i.e., by re-forming, at least a portion of tip rail 150 along at least a portion of tip plate 148. One or more layers of weld material 250 may be applied until the shape of tip rail prior to any damaged is restored, which may occur after subsequently applied machining. The layers can be performed with one weld wire material or with a combination of two different wire material compositions. As second weld material (not shown) can also be added in this embodiment as in FIG. 10.

Figure 12:
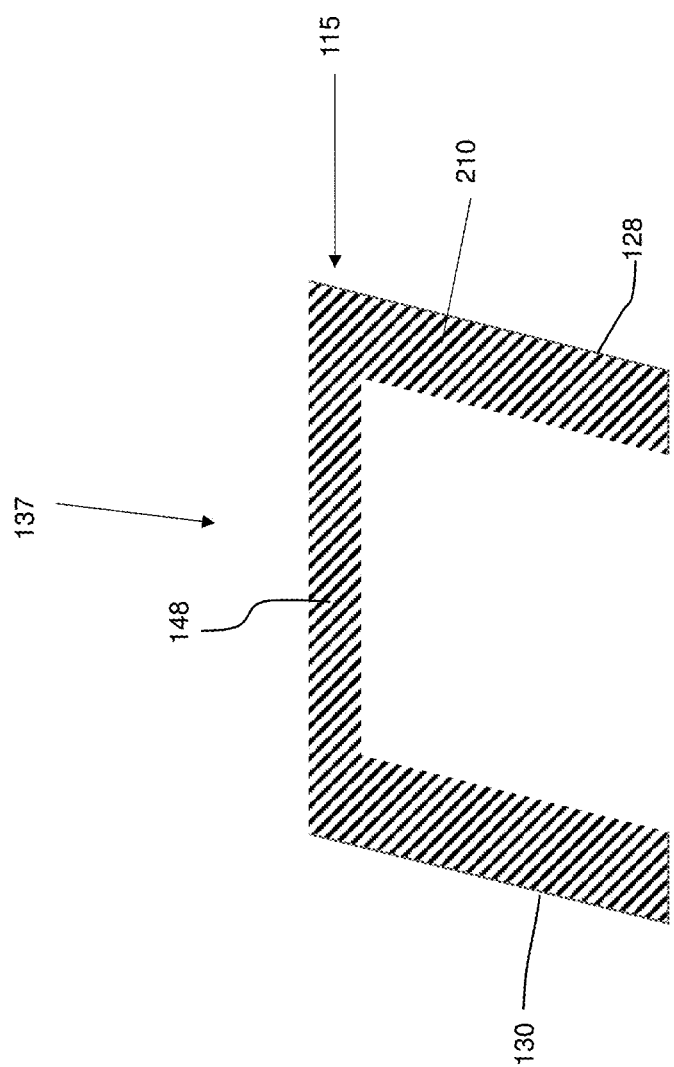
FIG. 12 shows a sectional view of a tip of a turbine rotor blade without a tip rail according to various embodiments of the disclosure.
Figure 13:
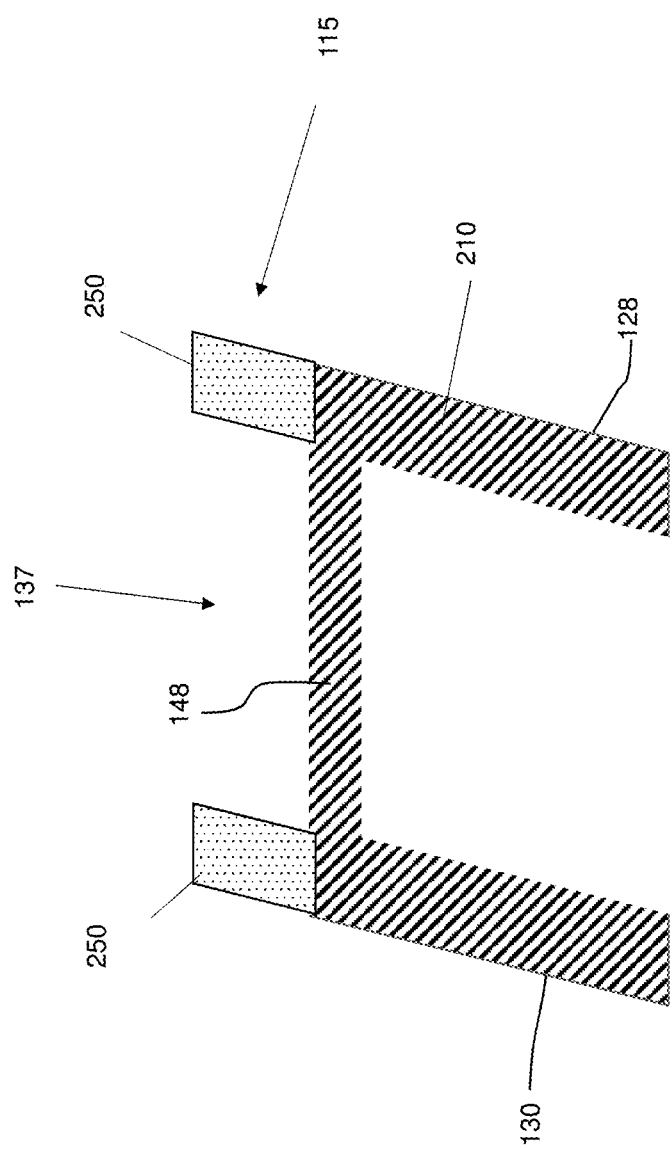
FIG. 13 shows a sectional view of a tip of a turbine rotor blade subjected to a welding process according to various embodiments of the disclosure.
Figure 14:
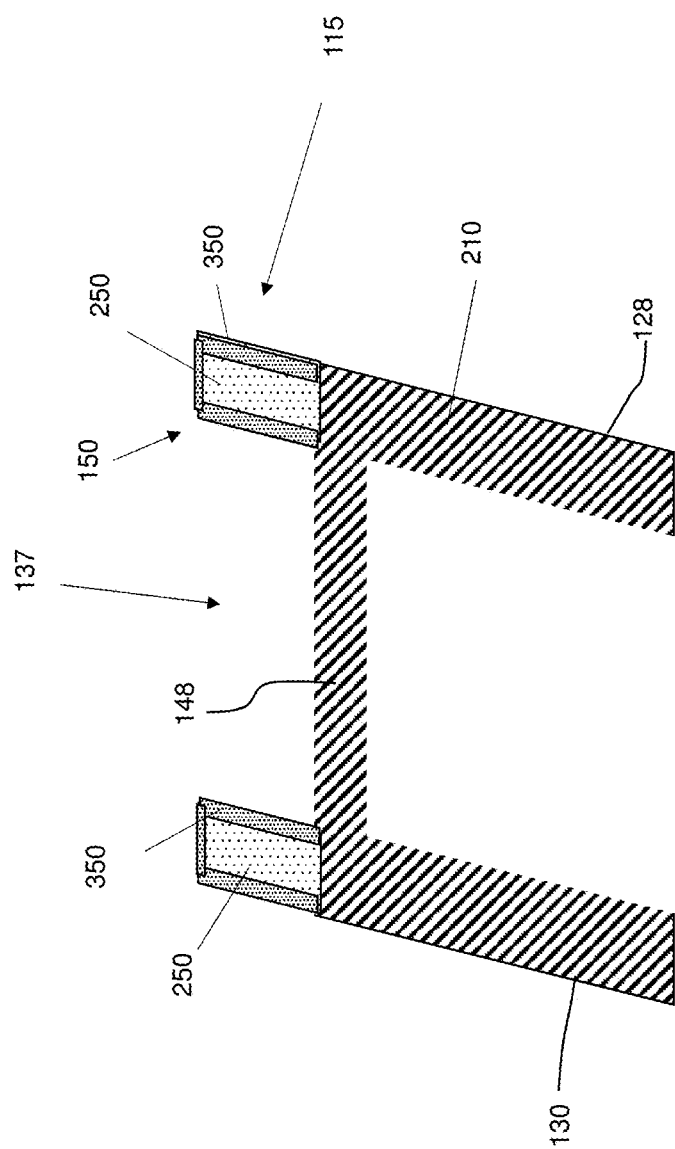
FIG. 14 shows a sectional view of a tip of a turbine rotor blade subjected to a welding process according to various embodiments of the disclosure.

FIGS. 12-14 show a method of manufacturing tip rail 150 (FIG. 6) where none existed previously. FIG. 12 shows a sectional view of tip 137 of turbine rotor blade 115 with tip plate 148, but no tip rail, bond coating or TBC. Turbine rotor blade 115 may be provided in this fashion during manufacture, e.g., after casting or additive manufacture thereof, or it may be provided in this fashion after use and after removal of tip rail 150 and removal of any bond coating or TBC. A surface of tip plate 148 may be cleaned and/or polished in this setting.

FIG. 13 shows one embodiment of forming at least a first portion of tip rail 150 (FIG. 6) by adding weld material 250 to at least a portion of an area about tip plate 148 by laser irradiating a wire material 252 (FIG. 4) with laser 254 (FIG. 4) in inert gas 262 (FIG. 4) in a vicinity of the at least a portion of the area about tip plate 148. The laser irradiation can be as described relative to FIGS. 4 and 5. As described relative to FIG. 10, one or more layers may be applied on at least a portion of the area of tip plate 148. Weld material 250 forms at least a portion of tip rail 150. One or more layers of weld material 250 may be applied until the shape of tip rail 150 is provided. The layers can be performed with one weld wire or with a combination of two different wire compositions. The composition of weld material 250 in FIG. 13 to form tip rail 150 may be as described herein for base material 210, e.g., Inconel 738.

FIG. 14 shows another embodiment starting from FIG. 12 in which at least a first portion of tip rail 150 (FIG. 6) is formed by adding weld material 250 to at least a portion of an area about tip plate 148 by laser irradiating a wire material 252 (FIG. 4) with laser 254 (FIG. 4) in inert gas 262 (FIG. 4) in a vicinity of the at least a portion of the area about tip plate 148. Here, first weld material 250 may be machined, e.g., to attain a smooth surface and/or get first weld material 250 closer to a desired final shape. Next, at least a second portion of tip rail 150 may be formed by advancing second wire material 252 (FIG. 4) into the at least a portion of the area about tip plate 148 while second laser irradiating the second wire material with laser 254 (FIG. 4) in inert gas 262 (FIG. 4) in a vicinity of first weld material 250. The second laser irradiating step may provide second weld material 350 of exterior surface coating(s) 220 (e.g., a more oxidation resistance material such as MCrAlY, described previously) on first weld material 250. That is, second weld material 350 may be a more oxidation resistant material than first weld material 250. Such oxidation resistance weld material 350 can improve the oxidation resistance of the tip rail 150. In one embodiment, shown in FIG. 14, a first welding step provides weld material 250, for example, Haynes 282® to build up the tip rail 150 followed by providing a second weld material 350 of oxidation resistance material such as MCrAlY on the first weld material 250. Such oxidation resistance weld material 350 can improve the oxidation resistance of the tip rail.

Figure 15:
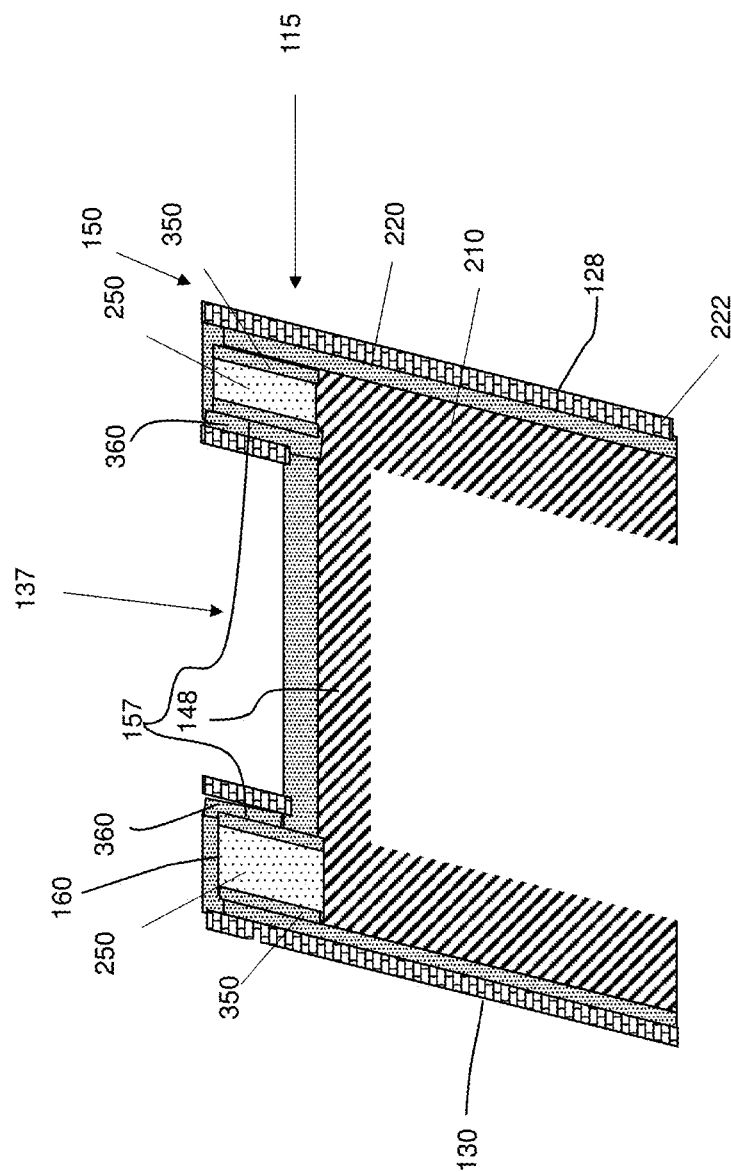
FIG. 15 shows a sectional view of a tip of a turbine rotor blade having a tip rail, exterior surface coating(s) and thermal barrier coating according to various embodiments of the disclosure.
Figure 16:
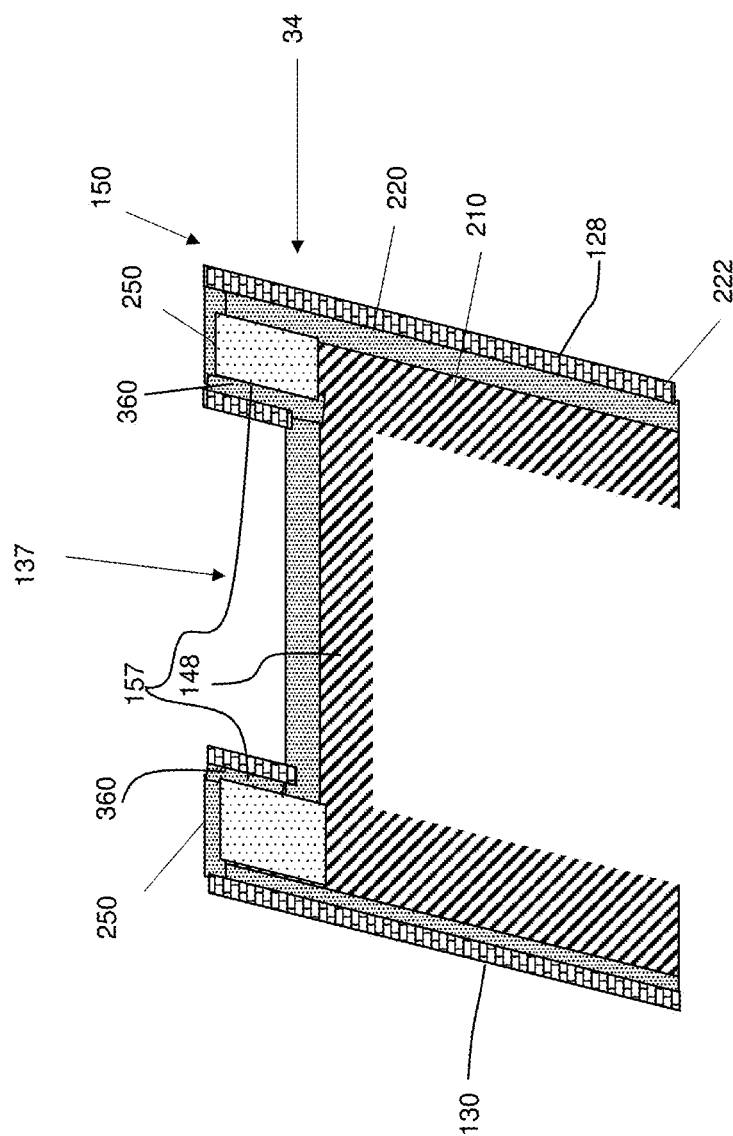
FIG. 16 shows a sectional view of a tip of a turbine rotor blade having a tip rail, exterior surface coating(s) and thermal barrier coating according to various embodiments of the disclosure.

FIGS. 15 and 16 shows spraying a bond coating 360 and TBC 222 on at least repaired or manufactured tip rail 150. From any of FIGS. 9-11, 13 and 14 embodiments, turbine rotor blade 115 can be formed to its near final shape, e.g., by machining After weld material 250 and/or 350 has been added to tip plate 148, i.e., either as a repair zone 292 or new, tip rail 150 excess weld material 250 and/or 350 may be removed by manual and/or CNC machining until the shape of tip rail 150 is within specification for turbine rotor blade 115. A further advantage of the process disclosed herein is the very limited required machining effort because of the near net shape nature of weld material 250 and/or 350 achieved during the welding process described below.

In accordance with embodiments of the disclosure, after formation of tip rail 150 as shown in FIG. 9-11, 13 or 14, a (new) bond coating 360 and a (new) TBC 222 may be spray applied to turbine rotor blade 115 and tip rail 150. More specifically, (new) bond coating 360 and (new) TBC 222 may be spray applied to at least inner rail surface 157 of tip rail 150 and any repaired damaged area thereof. It is noted that the spray application is not shown for each embodiment but only for samples thereof, for brevity. For example, FIG. 15 shows the FIG. 10 or 14 embodiment with the coatings, and FIG. 16 shows the FIG. 9 or 13 embodiments with the coatings. Those with skill in the art will readily appreciate the appearance of the other embodiments with a new bond coating 360 and TBC 222 applied thereon. In any event, at least inner rail surface 157 and any repaired damaged area 290 (just repaired damaged area of tip rail or entire replaced tip rail) may receive bond coating 360 and TBC 222 after formation of tip rail 150. Conventionally, inner rail surface 157 is not coated. Consequently, use of material(s) for welding having higher oxidation resistance, and coating a TBC in a region which is usually not coated to reduce temperature, may improve the lifetime of the tip rail. Bond coating 360 can be applied to the rest of turbine rotor blade 115 and tip rail 150 together, or separately. Bond coating 360 may be any of the afore-described bond coating materials, for example, MCrAlY, where M may be nickel (Ni) or cobalt (Co) or a combination thereof, cobalt nickel (CoNi) or nickel cobalt (NiCo). Bond coating 360 may be applied with, for example, a high velocity oxygen fuel (HVOF) process, a low vacuum plasma spray (LVPS) process, a low pressure plasma spray (LPPS) process or a vacuum plasma spray (VPS) process. After application of bond coating 360, turbine rotor blade 115 may be subjected to a heat treatment. Some portions of second weld material 350 may be removed prior to spraying, e.g., on radially outward facing rail surface 160 (FIG. 15).

In embodiments, after formation of tip rail 150 and bond coating 360, TBC 222 may be applied with air plasma spray (APS) with a special spray angle so that the component is coated at pressure and suction side walls 128, 130, at tip rail 150 and at inner rail surface 157. TBC 222 may include any now known or later developed TBC material such as but not limited to: yttria-stabilized zirconia (YSZ), mullite and alumina. TBC 222 may include additional layers also such as a thermally grown oxide.

The airfoil is coated with TBC with a standard process. When the coating gun is approaching radially outward facing rail surface 160 of tip rail 150, the coating gun inclination is modified in order to reach inner rail surface 157. The distance between the coating gun and tip rail 150 may be controlled to control the required angle and speed to reach the defined inner rail surface 157 position and coating thickness. With this approach of coating, the overspray and the adhesion of oversprayed coating is limited on the top of tip 137, e.g., tip plate 148, tip rail 150 and inner rail surface 157. This ensures that protection of tip 137 can be achieved without unneeded ceramic coating. No masking is required. The restored tip rail (just damaged area or replaced) or manufactured tip rail 150 has superior oxidation resistance to that of base material 210. This makes turbine rotor blade 115 and tip rail 150 resistant to damages in subsequent service.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

We claim:

1. A method for restoring a tip rail of a turbine rotor blade, the method comprising:
    repairing a damaged area in a tip rail of a turbine rotor blade by advancing a first wire material into the damaged area while first laser irradiating the first wire material with a laser in an inert gas in a vicinity of the damaged area, wherein the first laser irradiating the first wire material includes modulated pulsing the laser through:
        a first warm up phase during which an on-power of the laser is increased over time to a maximum target on-power for the first laser irradiating,
        a first melt and bond phase during which the wire material is melted and during which the on-power for the first laser irradiating is less than the maximum target on-power for the first laser irradiating, and a first stress releasing phase during which the on-power of the laser is less than the on-power during the melt and bond phase, wherein the first laser irradiated wire material forms a first weld material in the damaged area;

first spraying a bond coating on at least an inner rail surface of the tip rail and the repaired damaged area; and second spraying a thermal barrier coating (TBC) coating on the bond coating.

2. The method of claim 1, further comprising, prior to the first and second spraying:

machining the first weld material; and advancing a second wire material into the damaged area while second laser irradiating the second wire material with the laser in an inert gas in a vicinity of the damaged area of the exterior surface coating, wherein the second laser irradiating the second wire material includes modulated pulsing the laser through:

a second warm up phase during which the on-power of the laser is increased over time to a maximum target on-power for the second laser irradiating, a second melt and bond phase during which the second wire material is melted and during which the on-power for the second laser irradiating is less than the maximum target on-power for the second laser irradiating, and a second stress releasing phase during which the on-power of the laser is less than the on-power during the melt and bond phase, wherein the second laser irradiated wire material forms a second weld material in the damaged area and on the first weld material.

3. The method of claim 2, wherein the second wire material has a higher oxidation resistance than the first wire material.

4. The method of claim 2, further comprising machining the second weld material to further restore the tip rail to a shape thereof prior to the damaged area existing in the tip rail.

5. The method of claim 1, wherein:

the first wire material is one of a nickel-based superalloy selected from the group consisting of: Inconel 738, Inconel 625, IN739, CM-247-LC, Haynes 282®, Haynes 230, GTD 111, GTD 222, GTD 444, Rene N5, Rene N4, Rene 80, Rene 125, René 108, MAR-M-247, CMSX-4, MD2 alloy; and a cobalt-base superalloy selected from the group consisting of: FSX-414 and X45, and wherein the second wire material is selected from the group consisting of: MCrAlY, where M may be nickel (Ni) or cobalt (Co) or a combination thereof; cobalt nickel (CoNi); and nickel cobalt (NiCo).

6. The method of claim 1, wherein the first laser irradiating has a total duration of approximately 10 milliseconds (ms) to approximately 100 ms.

7. The method of claim 1, wherein the warm-up phase expends from approximately 0.1 to 5 percent of a first laser irradiating total duration, wherein the melt and bond phase expends from approximately 4.9 percent to approximately 30 percent of the laser irradiating total duration, and wherein the stress releasing phase expends from approximately 65 percent to approximately 95 percent of the laser irradiating total duration.

8. The method of claim 1, wherein the melt and bond phase uses approximately 50% to 90% of the maximum target on-power of the first laser irradiating target on-power.

9. The method of claim 1, wherein the bond coating comprises a MCrAlY alloy where M can be cobalt, nickel or a combination of cobalt and nickel, and wherein the TBC is selected from the group consisting of: yttria-stabilized zirconia (YSZ), mullite and alumina.

10. A method for manufacturing a tip rail for a turbine rotor blade, the method comprising:

providing the turbine rotor blade having a tip plate;

forming at least a first portion of the tip rail by adding material to at least a portion of an area about the tip plate by laser irradiating a wire material with a laser in an inert gas in a vicinity of the at least a portion of the area about the tip plate, wherein the laser irradiating the wire material includes modulated pulsing the laser through:

a first warm up phase during which an on-power of the laser is increased over time to a maximum target on-power for the first laser irradiating, a first melt and bond phase during which the wire material is melted and during which the on-power for the first laser irradiating is less than the maximum target on-power for the first laser irradiating, and a first stress releasing phase during which the on-power of the laser is less than the on-power during the melt and bond phase, wherein the irradiated wire material forms a first weld material forming the at least the first portion of the tip rail;

first spraying a bond coating on at least an inner rail surface of the tip rail; and second spraying a thermal barrier coating (TBC) coating on the bond coating.

11. The method of claim 10, further comprising, prior to the first and second spraying:

machining the first weld material; and forming at least a second portion of the tip rail by advancing a second wire material into the at least a portion of the area about the tip plate while second laser irradiating the second wire material with the laser in an inert gas in a vicinity of the first weld material, wherein the second laser irradiating the second wire material includes modulated pulsing the laser through:

a second warm up phase during which the on-power of the laser is increased over time to a maximum target on-power for the second laser irradiating, a second melt and bond phase during which the second wire material is melted and during which the on-power for the second laser irradiating is less than the maximum target on-power for the second laser irradiating, and a second stress releasing phase during which the on-power of the laser is less than the on-power during the melt and bond phase, wherein the second irradiated wire material forms a second weld material forming the at least the second portion of the tip rail.

12. The method of claim 11, wherein the second wire material has a higher oxidation resistance than the first wire material.

13. The method of claim 11, further comprising machining the second weld material to form the tip rail to a final shape thereof.

14. The method of claim 10, wherein:

the first wire material is one of a nickel-based superalloy selected from the group consisting of: Inconel 738, Inconel 625, IN739, CM-247-LC, Haynes 282®, Haynes 230, GTD 111, GTD 222, GTD 444, Rene N5, Rene N4, Rene 80, Rene 125, René 108, MAR-M-247, CMSX-4, MD2 alloy; and a cobalt-base superalloy selected from the group consisting of: FSX-414 and X45, and wherein the second wire material is selected from the group consisting of: MCrAlY, where M may be nickel (Ni) or cobalt (Co) or a combination thereof; cobalt nickel (CoNi); and nickel cobalt (NiCo).

15. The method of claim 10, wherein the first laser irradiating has a total duration of approximately 10 milliseconds (ms) to approximately 100 ms.

16. The method of claim 10, wherein the warm-up phase expends from approximately 0.1 to 5 percent of a first laser irradiating total duration, wherein the melt and bond phase expends from approximately 4.9 percent to approximately 30 percent of the laser irradiating total duration, and wherein the stress releasing phase expends from approximately 65 percent to approximately 95 percent of the laser irradiating total duration.

17. The method of claim 10, wherein the melt and bond phase uses approximately 50% to 90% of the maximum target on-power of the first laser irradiating target on-power.

18. The method of claim 10, wherein the bond coating comprises a MCrAlY alloy where M can be cobalt, nickel or a combination of cobalt and nickel, and wherein the TBC is selected from the group consisting of: yttria-stabilized zirconia (YSZ), mullite and alumina.

* * * * *